United States Patent
Bai et al.

(10) Patent No.: US 11,534,969 B2
(45) Date of Patent: Dec. 27, 2022

(54) SINGLE SCREW EXTRUSION SPRAYER OF A 3D PRINTER

(71) Applicant: SHAANXI UNIVERSITY OF TECHNOLOGY, Shaanxi (CN)

(72) Inventors: Haiqing Bai, Shaanxi (CN); Li Ren, Shaanxi (CN)

(73) Assignee: SHANNXI UNIVERSITY OF TECHNOLOGY, Hanzhong (CN)

( * ) Notice: Subject to any disclaimer, the term of this patent is extended or adjusted under 35 U.S.C. 154(b) by 221 days.

(21) Appl. No.: 17/103,412

(22) Filed: Nov. 24, 2020

(65) Prior Publication Data

US 2021/0291443 A1 Sep. 23, 2021

(30) Foreign Application Priority Data

Mar. 19, 2020 (CN) .......................... 202010193765.7

(51) Int. Cl.
- *B29C 64/209* (2017.01)
- *B33Y 30/00* (2015.01)
- *B29C 64/106* (2017.01)
- *B29C 64/118* (2017.01)

(52) U.S. Cl.
CPC .......... *B29C 64/209* (2017.08); *B29C 64/106* (2017.08); *B29C 64/118* (2017.08); *B33Y 30/00* (2014.12)

(58) Field of Classification Search
CPC ...... B22F 10/18; B22F 12/53; B29C 48/2526; B29C 64/118; B29C 64/209
See application file for complete search history.

(56) References Cited

U.S. PATENT DOCUMENTS

| 556,472 A | * | 3/1896 | McCarroll | ................ B22C 7/02 118/301 |
| 5,764,521 A | * | 6/1998 | Batchelder | .............. B29C 48/92 425/149 |
| 2016/0263822 A1 | * | 9/2016 | Boyd, IV | .............. B28B 11/001 |
| 2017/0144369 A1 | * | 5/2017 | Suvorov | ............. B29C 48/3003 |
| 2017/0295816 A1 | * | 10/2017 | Wang | ..................... B33Y 30/00 |
| 2017/0326773 A1 | * | 11/2017 | Gibson | ................... B29C 48/91 |

FOREIGN PATENT DOCUMENTS

| CN | 108620587 | * | 10/2018 | |
| CN | 109624324 | * | 4/2019 | |
| CN | 109732899 A | | 5/2019 | |
| EP | 3782797 A1 | * | 2/2021 | ............ B29C 48/02 |
| WO | 2018210183 A1 | | 11/2018 | |

* cited by examiner

*Primary Examiner* — Manley L Cummins, IV

(57) ABSTRACT

A single screw extrusion sprayer of a 3D printer includes a drive mechanism, a stir mechanism, and an extrusion mechanism. A side of the drive mechanism is connected to the stir mechanism to drive the stir mechanism to rotate, and another side of the drive mechanism is connected to the extrusion mechanism to drive the extrusion mechanism to rotate. The extrusion mechanism is connected to the stir mechanism to deliver stirred particles to the stir mechanism. The single screw extrusion sprayer has a compact structure and a light weight, and can be used in desktop 3D printers. The particle material can be melted for 3D printing.

10 Claims, 2 Drawing Sheets

US 11,534,969 B2

SINGLE SCREW EXTRUSION SPRAYER OF A 3D PRINTER

CROSS-REFERENCE TO RELATED APPLICATIONS

This application claims the benefit of priority from Chinese Patent Application No. 202010193765.7, filed on Mar. 19, 2020. The content of the aforementioned applications, including any intervening amendments thereto, is incorporated herein by reference in its entirety.

TECHNICAL FIELD

The disclosure relates to three-dimensional (3D) printers, and more particularly to a single screw extrusion sprayer of a 3D printer.

BACKGROUND 3D printing that's evolving in recent years is advantageous over traditional subtractive manufacturing in terms of forming methods, and has ignited wide interests in manufacturing. However, there are still some obstacles in developing 3D printers. For most 3D printers, the printing materials are limited to the filament material, whereas the granular material and powder material are not suitable for printing. In addition, during printing, a combination of the molten filament at the nozzle and the unmolten filament above the molten filament is in a piston-like extrusion state, which provides an unstable extrusion force and further influences the performance of the printing. Besides, as for the commonly used screw extruders, the screw rod thereof is hard to detach for cleaning and replacement, and the heat source thereof is located at a fixed position, failing to realize a flexible production of a variety of printing materials. Furthermore, large-scale extruders are not suitable for desktop 3D printers.

SUMMARY

In view of this, an object of the present disclosure is to provide a single screw extrusion sprayer of a 3D printer.

The present disclosure provides a single screw extrusion sprayer of a 3D printer, comprising:

a drive mechanism;

a stir mechanism; and an extrusion mechanism;

wherein a side of the drive mechanism is connected to the stir mechanism to drive the stir mechanism to rotate, and another side of the drive mechanism is connected to the extrusion mechanism to drive the extrusion mechanism to rotate; and the extrusion mechanism is connected to the stir mechanism to deliver stirred particles to the extrusion mechanism.

In some embodiments, the drive mechanism comprises a support and a double-shaft stepping motor connected to the support; a side of the double-shaft stepping motor is connected to the stir mechanism through a pair of first bevel gears; and another side of the double-shaft stepping motor is connected to the extrusion mechanism through a pair of second bevel gears.

In some embodiments, the stir mechanism comprises a first support plate, a stir shaft, a stir claw, a hopper, and a feed tube; the first support plate is connected to the support; one end of the stir shaft is arranged on the first support plate, and the other end of the stir shaft is extended into the hopper; the stir claw is located in the hopper and arranged on the stir shaft; a bottom of the hopper is connected to the extrusion mechanism via the feed tube; and one of the pair of first bevel gears is arranged on the stir shaft, and the other one of the pair of first bevel gears is connected to an output end of a side of the double-shaft stepping motor.

In some embodiments, the extrusion mechanism comprises a second support plate, a spline shaft, a screw rod, a barrel, and a nozzle; a side of the second support plate is connected to the support; one end of the spline shaft is arranged on the second support plate, and the other end of the spline shaft is connected to the screw rod; the screw rod is inserted in the barrel; the nozzle is arranged at a bottom of the barrel; the feed tube is connected to the barrel; and a heating and heat dissipating assembly is arranged at a lower side of the barrel.

In some embodiments, the screw rod is provided with a spline; the spline shaft is connected to the screw rod via a spline housing; and the spline shaft is inserted in a threaded lock sleeve to axially lock the spline housing.

In some embodiments, the screw rod is positioned and supported by a flange bearing and a bearing seat; the barrel is connected to the bearing seat via a screw and the flange bearing; and the bearing seat is positioned on the support via a pin location, and the bearing seat and the support are connected via a bolt.

In some embodiments, the heating and heat dissipating assembly comprises a heating jacket, a fan, and a heat dissipating sleeve; the barrel is inserted into the heating jacket and the heat dissipating sleeve; the heating jacket is arranged at the lower side of the barrel; the heat dissipating sleeve is located above the heating jacket; and the fan is arranged outside the heat dissipating sleeve and is fixed on the support via a fan base.

In some embodiments, a heat-insulating plate is arranged between the fan base and the support.

In some embodiments, the heating and heat dissipating assembly further comprises a reinforcing mechanism arranged below the stir mechanism; a side of the reinforcing mechanism is connected to the extrusion mechanism.

In some embodiments, the reinforcing mechanism comprises a plurality of reinforcing plates and a third support plate; the plurality of reinforcing plates are connected to the third support plate via screws; and the third support plate is fixed on the support via a screw.

Compared to the prior art, the single screw extrusion sprayer has a compact structure and a light weight, and can be used in desktop 3D printers. The particle material can be melted for 3D printing.

Figure 1:
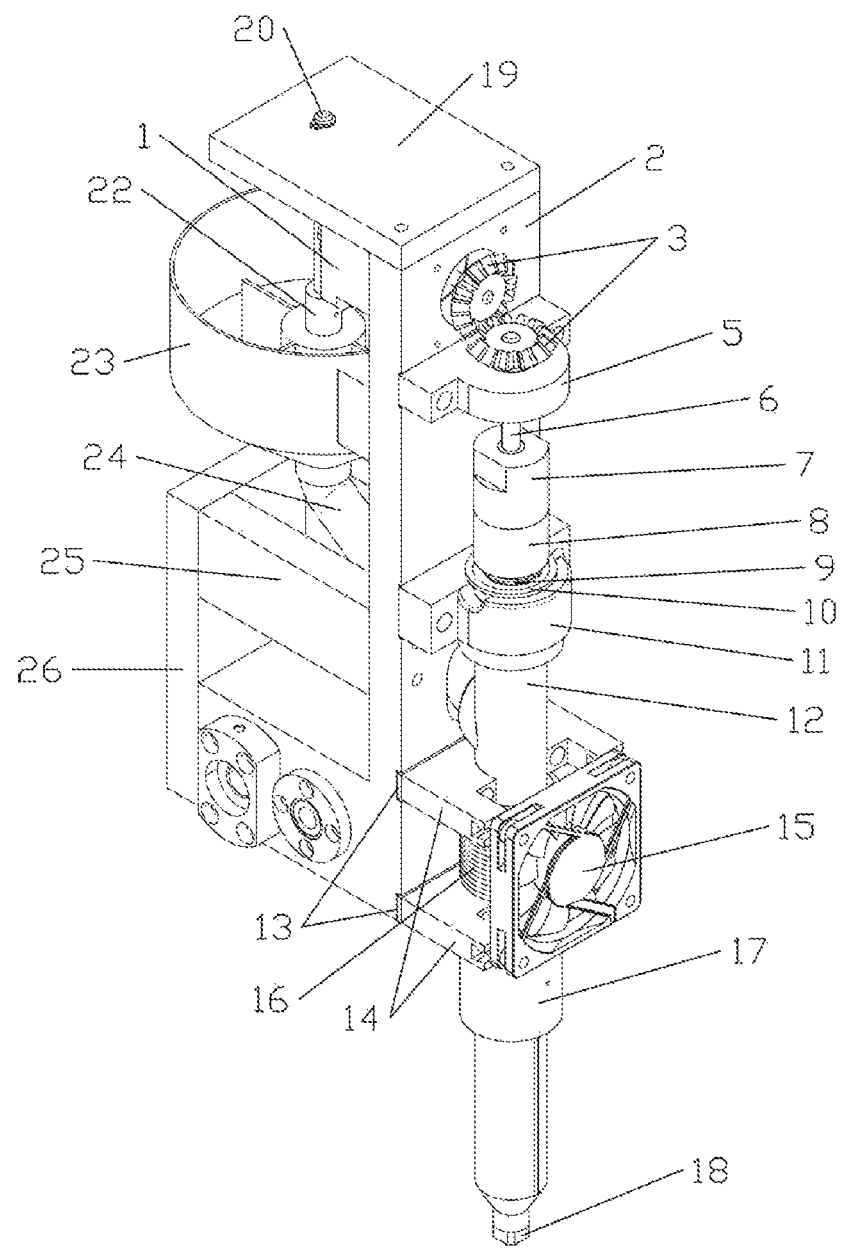
FIG. 1 is a perspective view of a single screw extrusion sprayer of a 3D printer according to an embodiment of the present disclosure.
Figure 2:
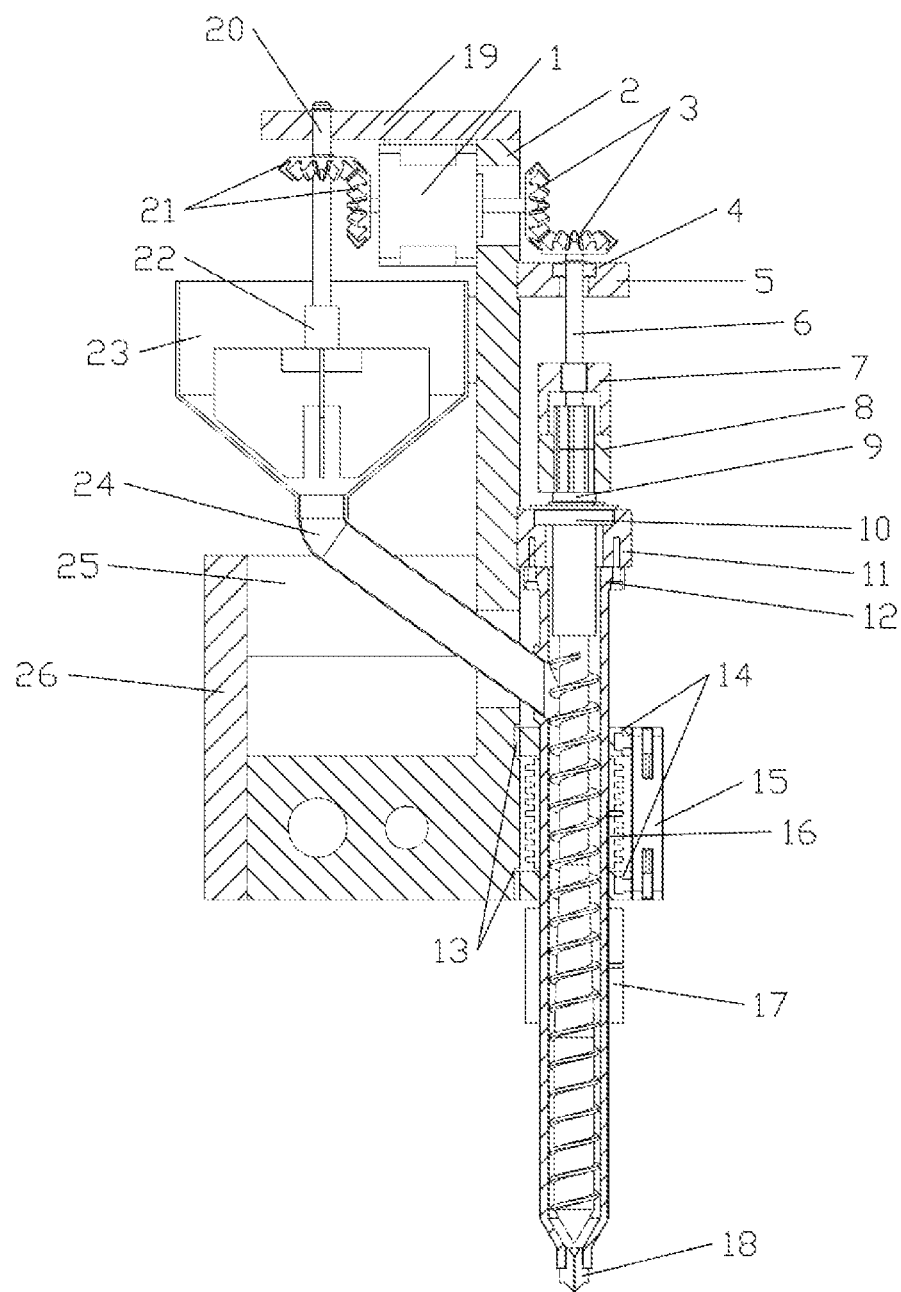
FIG. 2 is a cross-sectional view of the single screw extrusion sprayer according to an embodiment of the present disclosure.

In the drawings, 1, stepping motor; 2, support; 3, second bevel gear; 4, bearing; 5. second support plate; 6, spline shaft; 7, threaded lock sleeve; 8, spline housing; 9, screw rod; 10, flange bearing; 11, bearing seat; 12, barrel; 13, heat-insulating plate; 14, fan base; 15, fan; 16, heat dissipating sleeve; 17, heating jacket; 18, nozzle; 19, first support plate; 20, stir shaft; 21, second bevel gear; 22, stir claw; 23, hopper; 24, feed tube; 25, reinforcing plate; and 26, third support plate.

DETAILED DESCRIPTION OF EMBODIMENTS

The objects, technical solutions and beneficial effects will be further illustrated with reference to the accompanying drawings and embodiments. It should be noted that the embodiments provided herein are only illustrative, and do not intend to limit the scope of the present disclosure.

This embodiment provides a single screw extrusion sprayer of a 3D printer, including a drive mechanism, a stir mechanism, and an extrusion mechanism. A side of the drive mechanism is connected to the stir mechanism to drive the stir mechanism to rotate, and another side of the drive mechanism is connected to the extrusion mechanism to drive the extrusion mechanism to rotate. The extrusion mechanism is connected to the stir mechanism to deliver stirred particles to the stir mechanism.

Compared to conventional 3D printers, more types of printing materials, such as particles, can be applied for the 3D printer of the present disclosure. In addition, the printing process has a stable and continuous pressure.

The drive mechanism includes a support 2 and a double-shaft stepping motor 1 connected to the support 2. A side of the double-shaft stepping motor 1 is connected to the stir mechanism through a pair of first bevel gears 21, and another side of the double-shaft stepping motor 1 is connected to the extrusion mechanism through a pair of second bevel gears 3.

The stir mechanism includes a first support plate 19, a stir shaft 20, a stir claw 22, a hopper 23, and a feed tube 24. The first support plate 19 is connected to the support 2. One end of the stir shaft 20 is arranged on the first support plate 19, and the other end of the stir shaft 20 is extended into the hopper 23. The stir claw 22 is located in the hopper 23 and arranged on the stir shaft 20. A bottom of the hopper 23 is connected to the extrusion mechanism via the feed tube 24. One of the pair of first bevel gears 21 is arranged on the stir shaft 20, and the other one of the pair of first bevel gears 21 is connected to an output end of a side of the double-shaft stepping motor 1.

The first support plate 19 is connected to the support 2 via a screw, and the stir shaft 20 is positioned on the fixing plate 19 via a snap spring. The stir claw 22 is made of resin, and is connected to the stir shaft 20 via a set screw and configured to stir particles in the hopper 23, avoiding the bridge block of the particles.

The extrusion mechanism includes a second support plate 5, a spline shaft 6, a screw rod 9, a barrel 12, and a nozzle 18. A side of the second support plate 5 is connected to the support 2. One end of the spline shaft 6 is arranged on the second support plate 5, and the other end of the spline shaft 6 is connected to the screw rod 9. The screw rod 9 is inserted in the barrel 12. The nozzle 18 is arranged at a bottom of the barrel 12. The feed tube 24 is connected to the barrel 12. A heating and heat dissipating assembly is arranged at a lower side of the barrel 12.

The screw rod 9 is provided with a spline, and the spline shaft 6 is connected to the screw rod 9 via a spline housing 8. A threaded lock sleeve 7 is arranged on the spline shaft 6 to axially lock the spline housing 8.

The spline shaft 6 is connected to the second support plate 5 via a bearing 4 to fasten the extrusion mechanism. The second support plate 5 is positioned on the support 2 via a location pin and connected to the support 2 via a bolt.

The support 2 is arranged on a lead screw nut and a linear bearing to allow the sprayer to be movable along a Z direction, so that the overturning of the printer is avoided, thus improving the moving accuracy of the sprayer.

The spline shaft 6 has a stepped section. Threads are provided on the stepped section to allow the stepped section to engage with the threaded lock sleeve 7, so as to axially lock the spline housing 8.

The spline shaft 6 drives the screw rod 9 to rotate through the spline housing 8, and then the printing material in the barrel 12 is extruded out from the nozzle 18. When the threaded lock sleeve 7 is loosed, the spline housing 8 can be drawn out upward to quickly stop the transmission.

The threaded lock sleeve 7 is configured to realize rapid axial engagement and disengagement of the spline sleeve 8 and the screw rod 9.

The screw rod 9 is positioned and supported by a flange bearing 10 and a bearing seat 11. The barrel 12 is connected to the bearing seat 11 via a screw and a flange structure. The bearing seat 11 is positioned on the support 2 via a location pin, and the bearing seat 11 and the support are connected via a bolt.

The bearing seat 11 and the flange bearing 10 are in a clearance fit, and the bearing seat 11 is provided with an opening, which facilitates the disassembly of the flange bearing 10 and the screw rod 9. The bearing seat 11 is positioned on the support 2 via a location pin, and the bearing seat 11 and the support 2 are connected and locked via a bolt.

The screw rod 9 is convenient to detach for cleaning and replacement. Aiming at different printing materials, the location of the heating and heat dissipating assembly is changeable through sliding in a slide slot of the barrel 12, realizing the compact assembly of the screw extrusion mechanism and the feeding mechanism, which is suitable for desktop 3D printers.

The heating and heat dissipating assembly includes a heating jacket 17, a fan 15, and a heat dissipating sleeve 16. The barrel 12 is inserted into the heating jacket 17 and the radiating tube 16. The heating jacket 17 is arranged at the lower side of the barrel 12, and the heat dissipating sleeve 16 is located above the heating jacket 17. The fan 15 is arranged outside the heat dissipating sleeve 16 and is fixed on the support 2 via a fan base 14.

A slide slot is arranged outside the barrel 12, and engages with set screws of the heating dissipating sleeve 16 and the heating jacket 17, so as to realize vertical positioning of the heating dissipating sleeve 16 and the heating jacket 17.

The heating jacket 17 is provided with 8 holes for inserting heating resistance wires. The number of working heating resistance wires is controlled to adjust the heat input of the printer to adapt different printing materials. The holes are symmetrically arranged to evenly transmit the heat.

The heat dissipating sleeve 16 is arranged between the fan base 14 and the barrel 12 to enhance the heat dissipation performance of the screw rod 9 and prevent excessive heat accumulation in the miniaturized screw extruder since the excessive heat accumulation leads to the liquefying of the printing material.

A T-shaped slot is provided on a side of the fan base 14 to laterally withdraw the fan. In some embodiments, a magnetic strip is inserted into the T-shaped slot, and ferrous materials are arranged at four corners of the fan 15 to provide a magnetic attachment to easily detach the fan 15.

The heating jacket 17 is positioned on the barrel 12 via a set screw and a screw hole. The heating jacket 17 is providing with 8 holes for inserting heating resistance wires.

The number of working heating resistance wires is controlled to control the heat input of the printer to adapt different printing materials. The holes are symmetrically arranged to evenly transmit the heat.

A heat-insulating plate 13 is arranged between the fan base 14 and the support 2 to prevent the heat from being transmitted to a hole located below the third support plate 26 and configured to arrange the leadscrew nut and the linear bearing, thus eliminating the influence on the accuracy of the printer.

In some embodiments, the sprayer further includes a reinforcing mechanism arranged below the stir mechanism. A side of the reinforcing mechanism is connected to the extrusion mechanism.

The reinforcing mechanism includes a plurality of reinforcing plates 25 and a third support plate 26. The plurality of reinforcing plates 25 are connected to the support plate 26 via screws, and the third support plate 26 is fixed on the support 2 via a screw.

The above mentioned are only preferred embodiments, and do not intend to limit the protection scope of the present disclosure.

What is claimed is:

1. A single screw extrusion sprayer of a three-dimensional (3D) printer, comprising:
    a drive mechanism;
    a stir mechanism; and
    an extrusion mechanism;
    wherein a side of the drive mechanism is connected to the stir mechanism to drive the stir mechanism to rotate, and another side of the drive mechanism is connected to the extrusion mechanism to drive the extrusion mechanism to rotate; and
    the extrusion mechanism is connected to the stir mechanism to deliver stirred particles to the extrusion mechanism.

2. The single screw extrusion sprayer of claim 1, wherein the drive mechanism comprises a support and a double-shaft stepping motor connected to the support; a first side of the double-shaft stepping motor is connected to the stir mechanism through a pair of first bevel gears; and a second side of the double-shaft stepping motor is connected to the extrusion mechanism through a pair of second bevel gears.

3. The single screw extrusion sprayer of claim 2, wherein the stir mechanism comprises a first support plate, a stir shaft, a stir claw, a hopper, and a feed tube; the first support plate is connected to the support; one end of the stir shaft is arranged on the first support plate, and the other end of the stir shaft is extended into the hopper; the stir claw is located in the hopper and arranged on the stir shaft; a bottom of the hopper is connected to the extrusion mechanism via the feed tube; and one of the pair of first bevel gears is arranged on the stir shaft, and the other one of the pair of first bevel gears is connected to an output end of the first side of the double-shaft stepping motor.

4. The single screw extrusion sprayer of claim 3, wherein the extrusion mechanism comprises a second support plate, a spline shaft, a screw rod, a barrel, and a nozzle; a side of the second support plate is connected to the support; one end of the spline shaft is arranged on the second support plate, and the other end of the spline shaft is connected to the screw rod; the screw rod is inserted in the barrel; the nozzle is arranged at a bottom of the barrel; the feed tube is connected to the barrel; and a heating and heat dissipating assembly is arranged at a lower side of the barrel.

5. The single screw extrusion sprayer of claim 4, wherein the screw rod is provided with a spline; the spline shaft is connected to the screw rod via a spline housing; and the spline shaft is inserted in a threaded lock sleeve to axially lock the spline housing.

6. The single screw extrusion sprayer of claim 5, wherein the screw rod is positioned and supported by a flange bearing and a bearing seat; the barrel is connected to the bearing seat via a screw and the flange bearing; and the bearing seat is positioned on the support via a pin location, and the bearing seat and the support are connected via a bolt.

7. The single screw extrusion sprayer of claim 6, wherein the heating and heat dissipating assembly comprises a heating jacket, a fan, and a heat dissipating sleeve; the barrel is inserted into the heating jacket and the heat dissipating sleeve; the heating jacket is arranged at the lower side of the barrel; the heat dissipating sleeve is located above the heating jacket; and the fan is arranged outside the heat dissipating sleeve and is fixed on the support via a fan base.

8. The single screw extrusion sprayer of claim 7, wherein a heat-insulating plate is arranged between the fan base and the support.

9. The single screw extrusion sprayer of claim 1, further comprising a reinforcing mechanism arranged below the stir mechanism; wherein a side of the reinforcing mechanism is connected to the extrusion mechanism.

10. The single screw extrusion sprayer of claim 9, wherein the reinforcing mechanism comprises a plurality of reinforcing plates and a support plate; the plurality of reinforcing plates are connected to the support plate via screws; and the third support plate is fixed on a support via a screw.

* * * * *